(12) United States Patent
Chung et al.

(10) Patent No.: US 8,886,384 B2
(45) Date of Patent: Nov. 11, 2014

(54) LAWN MOWER FOR FORMING IMAGES

(75) Inventors: Hakyoung Chung, Seoul (KR); Lauro Ojeda, Ann Arbor, MI (US)

(73) Assignee: Microinfinity, Inc., Gyeonggi-Do (KR)

( * ) Notice: Subject to any disclaimer, the term of this patent is extended or adjusted under 35 U.S.C. 154(b) by 489 days.

(21) Appl. No.: 13/086,690

(22) Filed: Apr. 14, 2011

(65) Prior Publication Data
US 2012/0158236 A1  Jun. 21, 2012

(30) Foreign Application Priority Data
Dec. 16, 2010  (KR) .................. 10-2010-0129237

(51) Int. Cl.
| | | |
|---|---|---|
| G01C 22/00 | (2006.01) | |
| G05D 1/00 | (2006.01) | |
| A01D 34/00 | (2006.01) | |
| G06F 19/00 | (2011.01) | |
| A01D 34/835 | (2006.01) | |

(52) U.S. Cl.
CPC ...... *A01D 34/008* (2013.01); *G05D 2201/0208* (2013.01); *A01D 34/835* (2013.01); *Y10S 901/01* (2013.01)
USPC .................... 701/25; 901/1; 56/229; 700/245

(58) Field of Classification Search
CPC .............. A01D 34/835; A01D 34/008; G05D 2201/0208
USPC .................... 701/2, 25, 410–430, 533; 901/1; 700/245, 253; 56/229; 76/82, 82.1; 280/443
See application file for complete search history.

(56) References Cited

U.S. PATENT DOCUMENTS

| | | | | |
|---|---|---|---|---|
| 5,681,129 | A | * | 10/1997 | Nicodemo et al. .............. 404/72 |
| 2005/0007057 | A1 | * | 1/2005 | Peless et al. .................. 318/580 |
| 2009/0055004 | A1 | * | 2/2009 | Davis ............................... 700/90 |
| 2011/0039021 | A1 | * | 2/2011 | Persson et al. ................ 427/137 |
| 2011/0166705 | A1 | * | 7/2011 | Anderson et al. ............. 700/253 |

FOREIGN PATENT DOCUMENTS

| | | |
|---|---|---|
| KR | 20-0429035 Y1 | 10/2006 |
| KR | 10-0912408 B1 | 10/2009 |
| KR | 10-0960359 B1 | 5/2010 |

OTHER PUBLICATIONS

Jeff Tyson, "How Inkjet Printer Work", how stuff works, Internet Wayback Archive, Jun. 17, 2010.*
"Best Robotic Mowers", Consumersearch, Internet Wayback Archive, Nov. 11, 2010.*

(Continued)

*Primary Examiner* — Khoi Tran
*Assistant Examiner* — Abby Lin
(74) *Attorney, Agent, or Firm* — Brian J. Colandreo; Jeffrey T. Placker; Holland & Knight LLP

(57) ABSTRACT

Provided is a lawn mower for forming images. The lawn mower includes: an image input unit receiving an image to be formed in a lawn area; a position detection unit detecting position information of the lawn mower on a movement path of the lawn mower; a lawn mowing unit processing a lawn according to any one of a plurality of lawn processing patterns which corresponds to each position on the movement path while the lawn mower moves along the movement path; and a control unit analyzing the image received from the image input unit, determining a lawn processing pattern, which corresponds to the position information detected by the position detection unit, to express the image in the lawn area and controlling the lawn mowing unit according to the determined lawn processing pattern and independently of the movement path.

6 Claims, 9 Drawing Sheets

(56) References Cited

OTHER PUBLICATIONS

Probotics, BigMow, http://www.probotics.com/bigmow.htm, Internet Way back Machine Version Dec. 25, 2008.*

English translation of abstract of KR10-0960359, 1 pg.
English translation of abstract of KR20-0429035, 1 pg.
English translation of abstract of KR10-0912408, 1 pg.

* cited by examiner

LAWN MOWER FOR FORMING IMAGES

RELATED APPLICATION

This application claims priority from Korean Patent Application No. 10-2010-0129237 filed on Dec. 16, 2010, the disclosure of which is incorporated herein by reference in its entirety.

BACKGROUND OF THE INVENTION

1. Field of the Invention

The present invention relates to a lawn mower for forming images, and more particularly, to a lawn mower for forming an image on a lawn by using the difference in height or cut texture of lawn grass or by bending part of the lawn grass, and a method of forming an image using the lawn mower.

2. Description of the Related Art

Lawns planted in gardens and parks have been manually managed using grass cutters. With the development of technology, however, various lawn mowers have recently been suggested. A lawn mower cuts lawn grass grown higher than a predetermined height or bends the lawn grass in a certain direction, thereby making a lawn look aesthetically neat and tidy and reducing the probability that an individual will get cut from a blade of grass grown long while doing outdoor activities, such as taking a walk or doing exercise, in a lawn area.

In particular, a method of processing (e.g., cutting) a lawn along a predetermined pattern to create an aesthetic effect has been proposed. In this method, grasses on a lawn may be cut to different lengths along the shape of an image, specifically, along unit pixels that constitute the image. Accordingly, the image may be formed on the lawn by the difference in light reflected by the grasses. Such a method of forming a pattern or image on a lawn is being widely used in wide lawn areas such as playing fields (e.g., soccer fields and baseball fields) and amusement parks.

To form an image on a lawn using this method, a worker has to manually cut the lawn along the image, and such manual work requires a lot of time. In addition, since the image can be formed on the lawn by the reflection of light, the worker is constrained by time, that is, can work only during daytime.

SUMMARY OF THE INVENTION

Aspects of the present invention provide a lawn mower which can automatically form a desired image on a lawn without requiring a user to manually draw the image on the lawn and cut every blade of grass on the lawn by himself or herself along the image.

Aspects of the present invention also provide a lawn mower which can significantly reduce the time required to form an image on a lawn, does not require expertise since a user of the lawn mower does not need to determine a movement path according to the shape of an image, and enables the user to work at any time, even after sunset.

Aspects of the present invention also provide a lawn mower which can rapidly form a desired image on a lawn by processing the lawn while moving along an arbitrary path in a lawn area, without having to repeatedly move along the image.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a lawn mower for forming images. The lawn mower includes: an image input unit receiving an image to be formed in a lawn area; a position detection unit detecting position information of the lawn mower on a movement path of the lawn mower; a lawn mowing unit processing a lawn according to any one of a plurality of lawn processing patterns which corresponds to each position on the movement path while the lawn mower moves along the movement path; and a control unit analyzing the image received from the image input unit, determining a lawn processing pattern, which corresponds to the position information detected by the position detection unit, to express the image in the lawn area and controlling the lawn mowing unit according to the determined lawn processing pattern and independently of the movement path.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
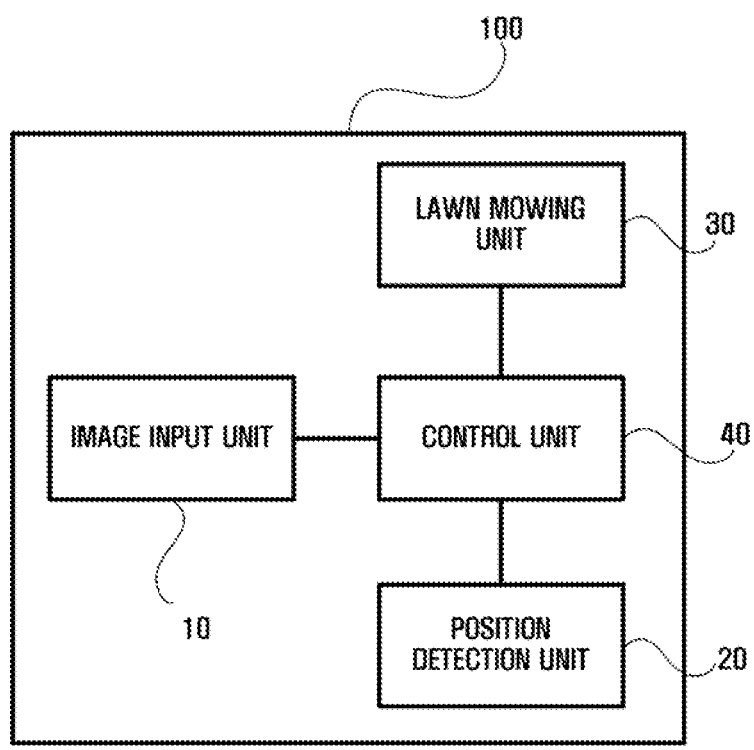
FIG. 1 is a block diagram of a lawn mower for forming images according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The present invention will be described more fully with reference to the accompanying drawings, in which exemplary embodiments of the invention are shown. Like reference numerals refer to like elements throughout the specification. As used herein, the term "and/or" includes any and all combinations of one or more of the associated listed items.

Figure 2:
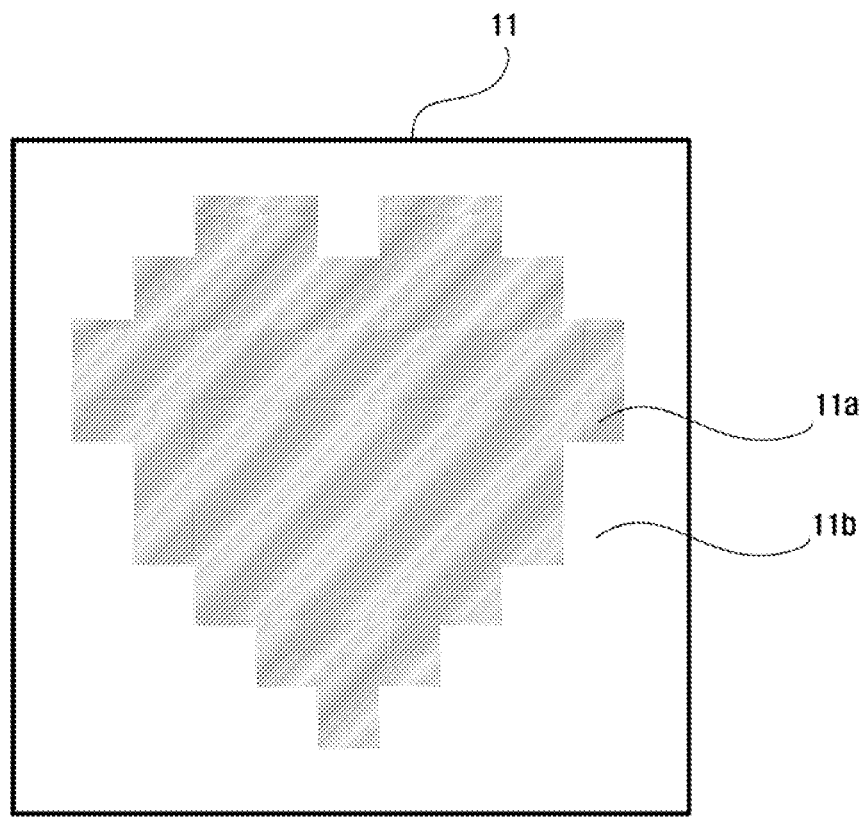
FIG. 2 is a diagram illustrating an example image input to the lawn mower of FIG. 1.
Figure 3:
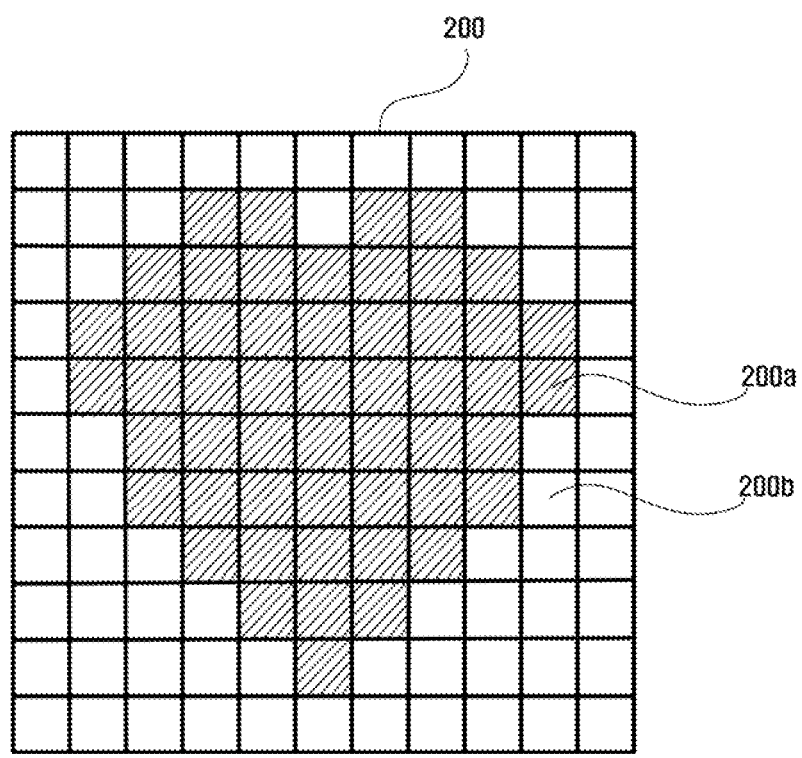
FIG. 3 is a diagram illustrating an actual lawn area to which the image analyzed by the lawn mower of FIG. 1 is mapped.

Hereinafter, a lawn mower for forming images according to an exemplary embodiment of the present invention will be described with reference to FIGS. 1 through 8. FIG. 1 is a block diagram of a lawn mower 100 for forming images according to an exemplary embodiment of the present invention. FIG. 2 is a diagram illustrating an example image input to the lawn mower 100 of FIG. 1. FIG. 3 is a diagram illustrating an actual lawn area 200 to which the image analyzed by the lawn mower 100 of FIG. 1 is mapped.

The lawn mower 100 for forming images according to the current exemplary embodiment includes an image input unit 10, a position detection unit 20, a lawn mowing unit 30, and a control unit 40. The image input unit 10 receives an image 11 to be formed in the lawn area 200, and the position detection unit 20 detects position information of the lawn mower 100 on a movement path 100_PATH of the lawn mower 100. The lawn mowing unit 30 processes a lawn while the lawn mower 100 moves along the movement path 100_PATH, specifically, processes the lawn according to one of a plurality of lawn processing patterns which corresponds to each position on the movement path 100_PATH. The control unit 40 analyzes the image 11 received from the image input unit 10, determines a lawn processing pattern, which corresponds to position information detected by the position detection unit 20, to express the image 11 in the lawn area 200 and controls the lawn mowing unit 300 according to the determined lawn processing pattern and independently of the movement path 100_PATH.

Specifically, the image input unit 10 receives the image 11 that is to be carved in the lawn area 200. The image 11 input to the image input unit 10 is sent to the control unit 40. Various forms of images 11 may be input through the image input unit 10. For example, an electronic image file such as a bitmap (BMP) file or a Joint Photographic Experts Group (JPEG) image file may be input. In this case, the lawn mower 100 according to the current exemplary embodiment may further include an image processing device that can read the electronic image file and process electronic information. Also, the lawn mower 100 may further include an input port for reading the electronic image file, such as a universal serial bus (USB) port, a memory slot, or a disk drive.

An example of the image 11 that can be input through the image input unit 10 is illustrated in FIG. 2. There are no restrictions on the form of the image 11 that can be input, and various forms of images 11 can be input. The lawn mower 100 according to the current exemplary embodiment is designed to express the input image 11 in the lawn area 200. Therefore, the lawn mower 100 may be affected by resolution of the input image 11. That is, since there is a limited minimum unit based on which lawn grasses can be processed to have different heights, it may be difficult to express the image 11 in units, which are smaller than the minimum unit, on the lawn. In this case, the image 11 is reprocessed based on the minimum unit and expressed in the lawn area 200.

The lawn mower 100 according to the current exemplary embodiment may form an image on a lawn by causing grasses on the lawn to produce different optical effects. Here, the different optical effects may be brought about by cutting or bending the grasses to different heights or cutting or bending the grasses in different directions. When the image 11 contains color information, the color image 11 may be converted into a black and white image by the image input unit 10, and the black and white image may be sent to the control unit 40.

In addition, as shown in the drawings, an original version of the image 11 may be simplified, and the simplified version may be sent to the control unit 40. That is, when the difference in height or direction achieved by cutting or bending the grass, i.e., a lawn processing pattern, is set to two patterns, the image 11 may be divided into a first region 11a which includes an image or unit pixels that form the image in the mapped lawn area 200 and a second region 11b which does not include an image or unit pixels that form the image.

In exemplary embodiments of the present invention, pixel information of the input image 11 may be simplified, and the image 11 with the simplified pixel information may be sent to the control unit 40. That is, since there is a limit to the number of pixels that can be distinguished in the lawn area 200 by the height of the lawn or the processing direction or pattern of the lawn, the pixel information of the image 11 may be simplified into pixels (e.g., an embossed portion of the lawn area 200) which form an image and pixels (e.g., an engraved portion of the lawn area 200) which do not form an image. The embossed portion and the engraved portion are mere examples, and the opposite is also possible.

The first region 11a that forms an image may be mapped to a first section 200a, in which grass is cut short at a low height, in the actual lawn area 200. On the contrary, the second region 11b may be mapped to a second section 220b in which grass is cut long at a high height. In this mapping method, the image 11 may be formed in the lawn area 200 by cutting or processing the grass of the first section 200a mapped to the first region 11a of the image 11 and the grass of the second section 200b mapped to the second region 11b to different heights.

The method of forming the image 11 in the lawn area 200 by cutting the lawn is not limited to the above method. For example, the engraved portion and the embossed portion may be reversed. That is, the first region 11a which forms an image may be mapped to the second section 200b in which the grass is cut relatively long at a high height, and the second region 11b may be mapped to the first section 200a. That is, in this mapping method, the image 11 may be formed by cutting the entire grass of the lawn area 200 except for the grass located along the outline of the image 11.

To form the image 11 by causing the first section 200a and the second section 200b to produce different optical effects, the grasses may be cut to different heights as described above. However, the grasses can also be cut to an equal height but in different directions. That is, the grass in the first section 200a may be cut, for example, in a 2 o'clock direction, and the grass in the second section 200b may be cut, for example, in a 10 o'clock direction. In this case, the grass of the first section 200a and that of the second section 200b may reflect different light in different angles, thereby forming an image. Here, the height of the grass of the first section 200a may be equal to or different from that of the grass of the second section 200b.

As will be described later, a user can freely move the lawn mower 100 according to the current exemplary embodiment to anywhere in the lawn area 200, regardless of whether it is the first section 200a or the second section 200b. As the lawn mower 100 moves, the control unit 40 automatically changes the lawn processing height or the lawn processing direction (e.g., the grass cutting or bending direction) of the lawn mowing unit 30 independently of the movement path 100_PATH or movement direction of the lawn mower 100. Therefore, an image can be easily formed in the lawn area 200.

For example, it may be set such that the grass in the first section 200a is cut along the 2 o'clock direction and that the grass in the second section 200b is cut along the 10 o'clock direction. In this case, if the lawn mower 100 moves in a 3 o'clock direction from a current position to be in the first section 200a, a blade of the lawn mowing unit 30 may be rotated to cut the grass in the 2 o'clock direction, independently of the 3 o'clock direction which is the movement direction of the lawn mower 100. If the lawn mower 100 moves in a 6 o'clock direction to be in the second section 200b, the blade of the lawn mowing unit 30 may be rotated to cut the grass in a 10 o'clock direction, independently of the 6 o'clock direction which is the movement direction of the lawn mower 100.

This operation can be achieved by obtaining information about current position of the lawn mower 100 using the position detection unit 20, mapping the image 11 to the lawn area 200 based on the obtained information using the control unit 40, and automatically setting the height or direction of the lawn mowing unit 30 for the current position using the control unit 40.

To form the image 11 by causing the first section 200a and the second section 200b to produce different optical effects, part of the grass on the lawn may be bent so that the grass has different heights. That is, a predetermined portion of the grass grown mostly vertically may be bent in a predetermined direction so that the grass has different heights. In addition, the grass of the first section 200a and that of the second section 200b may be bent in different directions to reflect different light in different angles. Here, the height of the grass of the first section 200a may be equal to or different from that of the grass of the second section 200b.

In the above-described example, the image 11 is formed by dividing the lawn area 200 into two processing patterns. However, the present invention is not limited to this example. The image 11 may also be formed in the lawn area 200 by processing the lawn according to three or more lawn processing patterns, i.e., three or more patterns with different heights and/or three or more patterns with different processing directions.

The position detection unit 20 detects the position of the lawn mower 100 according to the current exemplary embodiment in the lawn area 200. The lawn mower 100 according to the current exemplary embodiment may cut or bend the grass on the lawn while moving along the movement path 100_PATH that can be arbitrarily determined by the user or arbitrarily set by the control unit 40. Only when the current position of the lawn mower 100 in the lawn area 200 is identified, can a lawn processing pattern for a corresponding position in the image 11 mapped to the lawn area 200 can be accurately and automatically determined. That is, a position in the image 10 which corresponds to the current position of the lawn mower 100 in the lawn area 200 is identified by mapping the image 11 to the lawn area 200. Then, the control unit 40 sets the cutting height or the cutting or bending direction of the lawn mowing unit 30 based on the identified position in the image 10.

The position detection unit 20 may include a global positioning system (GPS) module or a wireless local area network (LAN) module to determine the position of the lawn mower 100. Otherwise, the position detection unit 20 may use various known methods such as a gyro sensor or an ultrasonic detection.

The position information detected by the position detection unit 20 is transmitted to the control unit 40. Then, the control unit 40 identifies the current position of the lawn mower 100 based on the position information and determines a lawn processing pattern for forming the image 11 based on the identified current position. Therefore, there is no need for the user to move the lawn mower 100 along the image 11. The user can form the desired image 11 in the lawn area 200 by simply moving the lawn mower 11 along an arbitrary movement path 100_PATH in the lawn area 200 since the position detection unit 20 determines where the lawn mower 100 is positioned in the image 11 and the control unit 40 automatically and continuously changes the lawn processing pattern of the lawn mowing unit 30 according to the determined position.

The lawn mowing unit 30 actually cuts or bends lawn grass in the lawn area 200. The lawn mowing unit 30 is formed adjacent to the ground planted with the grass.

The lawn mowing unit 30 may include a motor operating in response to a control signal received from the control unit 40 and a processor processing a lawn by being powered by the motor. The processor may include one of a blade with a cutting edge for cutting lawn grass and a roller for bending grass in a predetermined direction by pressing on the lawn grass. The above blade or roller is merely an example of the processor and can be replaced by any device that can cut or bend lawn grass.

As described above, the image 11 input to the image input unit 10 is sent to the control unit 40, and the control unit 40 analyzes the image 11 and processes a lawn according to a lawn processing pattern for a current position of the lawn mower 100, which corresponds to a position in the image 11, in the lawn area 200. Since a different lawn processing pattern is determined for each position in the lawn area 200, the image 11 may be formed in the lawn area 200 by the difference in reflection or refraction of light.

As shown in FIG. 1, the control unit 40 controls the image input unit 10, the position detection unit 20 and the lawn mowing unit 30 which constitute the lawn mower 100 according to the current exemplary embodiment of the present invention.

The image 11 input through the image input unit 10 is transmitted to the control unit 40, and the control unit 40 analyzes the image 11. Meanwhile, the user moves the lawn mower 100 along an arbitrary movement path 100_PATH in the lawn area 200. Once the lawn mower 100 moves, the position detection unit 20 detects the position of the lawn mower 100 in the lawn area 200. The position information detected by the position detection unit 20 is transmitted to the control unit 40. Then, the control unit 40 determines where the lawn mower 100 is currently positioned in the image 11 based on the received position information, determines a lawn processing pattern for the current position of the lawn mower 100, and controls the height or direction of the lawn mowing unit 30 according to the determined lawn processing pattern. For example, to process lawn grass short, the control unit 40 lowers the height of the lawn mowing unit 30 to be closer to the ground. On the contrary, to process the lawn grass long, the control unit 40 raises the height of the lawn mowing unit 30 to be farther from the ground. In addition, to form a pattern by cutting or bending the lawn grass in different directions, the control unit 40 may set the cutting or bending direction of the lawn mowing unit 30 according to the position of the lawn mower 100 in the lawn area 200.

After the lawn grass is cut to a predetermined height or into a predetermined pattern, if the user moves the lawn mower 100 to a next position along the arbitrarily determined movement path 100_PATH, the position detection unit 20 detects the new position of the lawn mower 100 in the lawn area 200. Then, the above process is repeated. In this way, the lawn mower 100 can process the entire lawn of the lawn area 200 to different predetermined heights or in different predetermined directions while moving along its movement path 100_PATH. Accordingly, the image 11 can be formed in the lawn area 200 by the difference in the height of the lawn grass or the difference in the cutting or bending direction of the lawn grass.

More specifically, referring to FIG. 3, the lawn area 200 evenly planted with lawn grass may consist of 11×11 square cells of a predetermined size. In this case, the image 11 provided as shown in FIG. 2 is mapped to the lawn area 200. To accurately reproduce the image 11 in the lawn area 200, the control unit 40 identifies a position in the image 11 which corresponds to the position of the lawn mower 100 which is detected by the position detection unit 20 and determines whether the identified position is in the first section 200a or the second section 200b.

If the current position of the lawn mower 100 is in the first section 200a of the lawn area 200, the control unit 40 lowers the height of the lawn mowing unit 30 to process the lawn such that the grass of the first section 200a is relatively shorter than the grass of the second section 200b.

On the other hand, if the current position of the lawn mower 100 is in the second section 200b of the lawn area 200, the control unit 40 raises the height of the lawn mowing unit 30 to process the lawn such that the grass of the second section 200b is longer than the grass of the first section 200a.

Various lawn processing methods used by the lawn mower 100 according to the current exemplary embodiment will now be described with reference to FIGS. 4 and 5.

As described above, the control unit 40 partitions the actual lawn area 200 into the first section 200a and the second section 200b (as shown in FIG. 3) based on the input image 11. In the current exemplary embodiment, a case where the lawn area 200 is divided into two sections is described as an example. However, the present invention is not limited to this example. The lawn area 200 may be partitioned into three or more sections (lawn processing patterns) by dividing the difference in the height of the lawn into three or more levels, so that the lawn area 200 produces various effects such as a light and shade effect or a three-dimensional (3D) effect.

Figure 4:
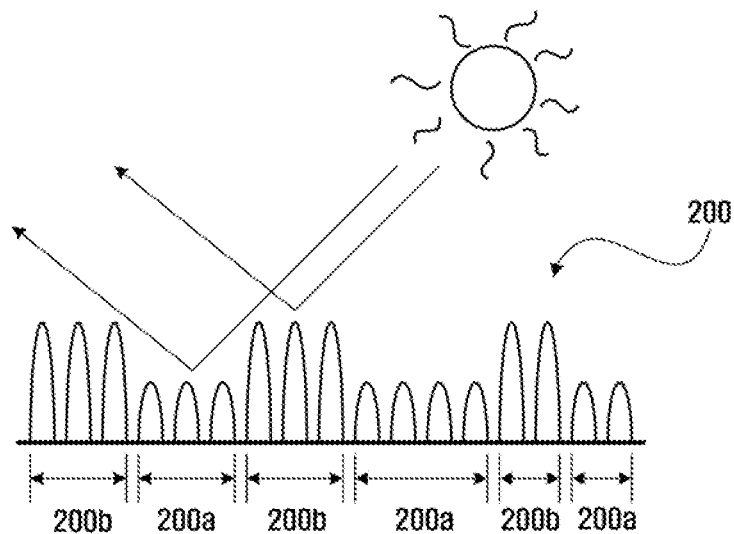
FIGS. 4 and 5 are diagrams for explaining various lawn processing methods used by the lawn mower of FIG. 1.

In FIG. 4, the lawn grass of the lawn area 200 is cut to a different height according to the section 200a or 200b of the lawn area 200. This operation can be accomplished when the lawn mowing unit 30 includes a blade for cutting lawn grass. The grass of the first section 200a of the lawn area 200 is shorter than the grass of the second section 200b. Therefore, the grass of the first section 200a and the grass of the second section 200b have different colors due to the difference in the amount of sunlight refracted and/or reflected, which cause to different wavelengths. Accordingly, an image visible with the naked eye is formed along a boundary between the first section 200a and the second section 200b.

Figure 5:
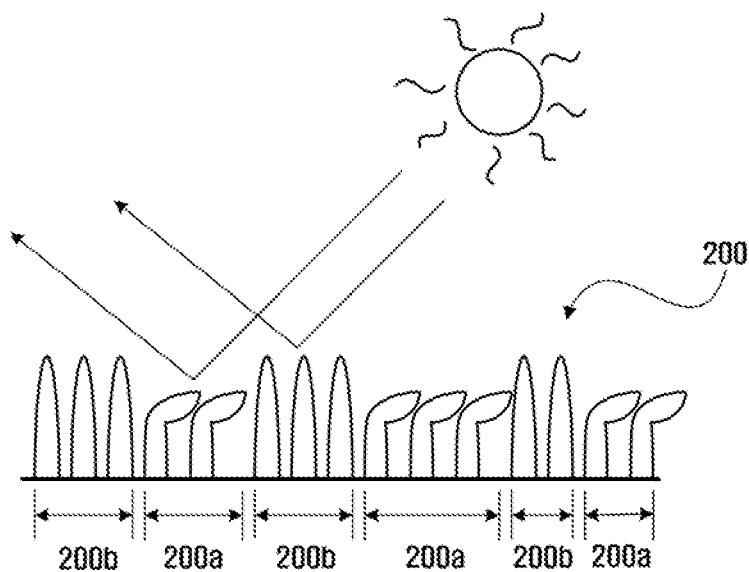

In FIG. 5, the lawn grass of the lawn area 200 is bent to a different height according to the section 200a or 200b of the lawn area 200. Cutting the lawn grass as described above is not the only way to form an image in the lawn area 200. Part of the lawn grass can also be bent in a certain direction so that the first section 200a and the second section 200b are distinguished from each other. This operation can be accomplished when the lawn mowing unit 30 includes a roller for bending lawn grass. Since the grass in the first section 200a of the lawn area 200 is bent, its overall height is lower than that of the grass in the second section 200b as in FIG. 4. In addition, the grass planted in the first section 200a is mostly parallel to the ground, unlike the grass planted in the second section 200b. Therefore, the amount of light reflected by the grass planted in the first section 200a is greater than the amount of light reflected by the grass planted in the second section 200b. Accordingly, the grass of the second section 200b and the grass of the first section 200b have different colors. Thus, an image visible with the naked eye is formed along the boundary between the second section 200b and the first section 200a.

The movement path 100_PATH and the lawn processing operation of the lawn mower 100 according to the current exemplary embodiment will now be described with reference to FIGS. 6 through 8.

The user of the lawn mower 100 according to the current exemplary embodiment may arbitrarily determine the movement path 100_PATH of the lawn mower 100 in the lawn area 200. The movement path 100_PATH may be arbitrarily determined by the user in view of the size and shape of the lawn area 200.

Figure 6A:
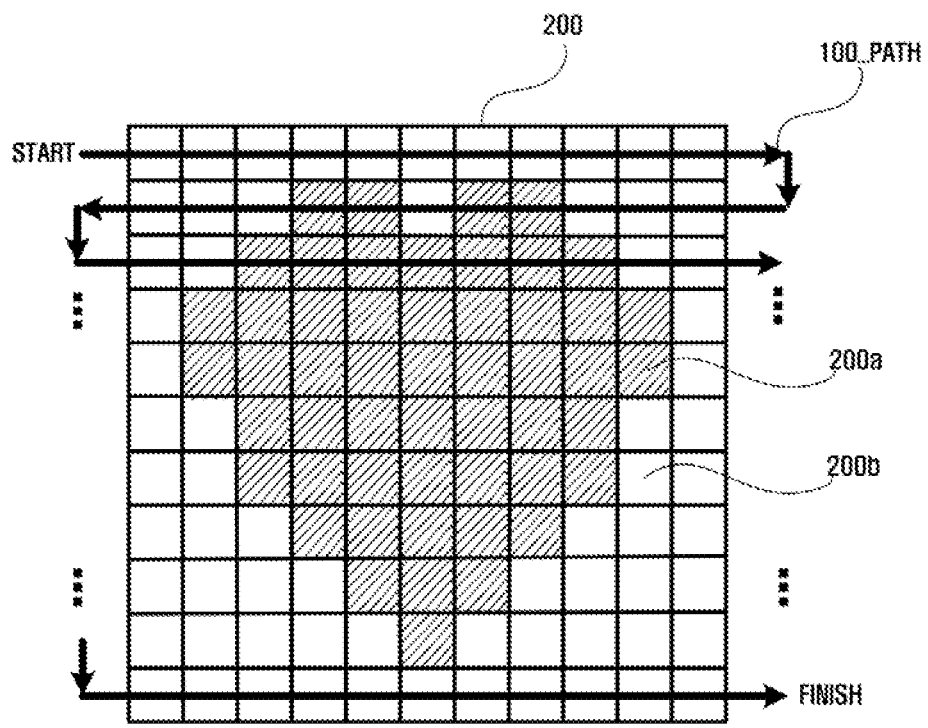
FIGS. 6A through 6C are diagrams illustrating arbitrary movement paths of the lawn mower of FIG. 1.
Figure 6B:
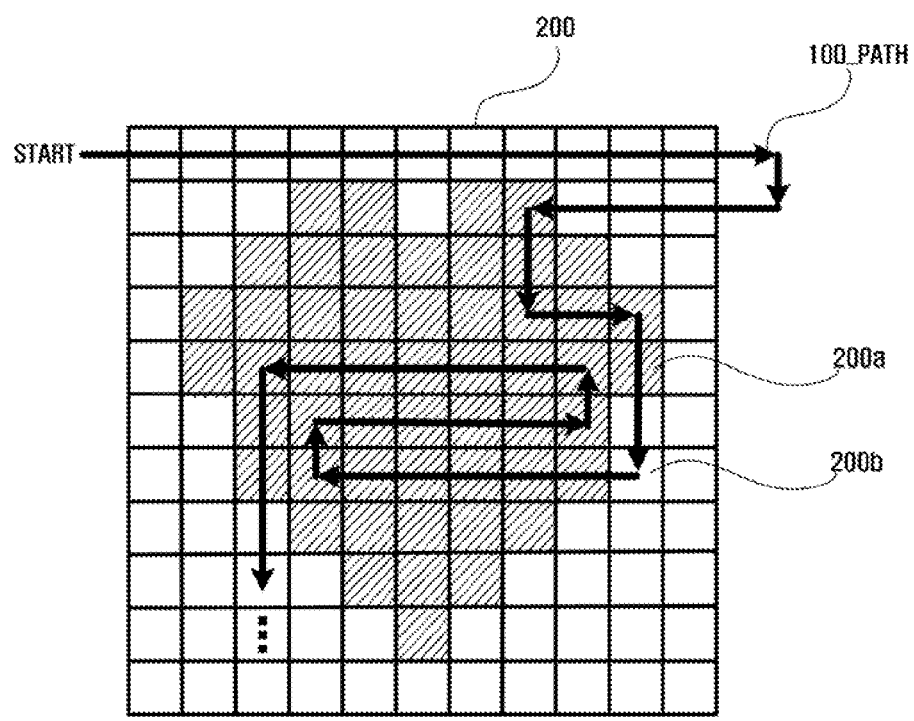

That is, the movement path 100_PATH may be determined to be in a zigzag form as shown in FIG. 6A and may form one line from a start point START to a finish point FINISH. In FIG. 6A, the lawn area 200 is square. However, this is merely an example, and the shape of the lawn area 200 is not limited to the square shape. Regardless of the shape of the lawn area 200, the zigzag path may be determined so that the entire region of the lawn area 200 can be scanned.

Specifically, the lawn mower 100 according to the current exemplary embodiment starts from the start point START of the movement path 100_PATH. In FIG. 6A, the start point START is located at a leftmost position in a highest row of the lawn area 200. That is, the user may control the lawn mower 100 to move from the start point START to the right in FIG. 6A. Since unit cells in the highest row are all included in the second section 200b, the lawn mowing unit 30 is raised to a predetermined height that is relatively higher than its height when in the first section 200a. The lawn mowing unit 30 raised to the predetermined height from the ground processes the lawn grass in the cells of the topmost row to a predetermined length. Adjusting the height of the lawn mower 100 according to the section 200a or 200b of the lawn area 200 is merely an example of a lawn processing pattern. As described above, the lawn can also be processed in different directions to reflect light in different directions, which cause to different wavelengths.

Next, the user may move the lawn mower 100 in a direction from a rightmost position to a leftmost position of a second highest row along the zigzag movement path 100_PATH. In FIG. 6A, fourth, fifth, seventh and eighth cells from the right in the second highest row are included in the first section 200a while the other cells are included in the second section 200b. Therefore, up to a third cell from the right in the second highest row, the lawn mowing unit 30 moving along the movement path 100_PATH is raised to process the lawn grass to the predetermined length or in the predetermined direction.

When the lawn mower 100 arrives at a fourth cell from the right, the control unit 40 lowers the lawn mowing unit 30 by sending a control signal to the lawn mowing unit 30. Accordingly, the lawn grass in the fourth cell is processed to a length shorter than the predetermined length or in a direction different from the predetermined direction. As in the fourth cell, the lawn grass in a fifth cell included in the second section 200b is processed to the length shorter than the predetermined length or in the direction different from the predetermined direction.

When the lawn mower 100 arrives at a sixth cell from the right in the second highest row, since the sixth cell is included in the first section 200a, the control unit 40 changes the height of the lawn mowing unit 30 by sending the control signal to the lawn mowing unit 30.

The above process is repeated until the lawn mower 100 arrives at the finish point FINISH after moving along the entire movement path 100_PATH shown in FIG. 6A. Accordingly, the operation of forming an image is completed.

The user may arbitrarily set the movement path 100_PATH of the lawn mower 100 according to the current exemplary embodiment to a form different from the zigzag form shown in FIG. 6A. That is, referring to FIG. 6B, the lawn mower 100 may form an image while moving along an arbitrary movement path 100_PATH in the lawn area 200. This is possible because a lawn processing pattern at a current position of the lawn mower 100 can be determined based on position information detected by the position detection unit 20 of the lawn mower 100. Therefore, an image can be formed in the lawn area 200 regardless of the form of the movement path 100_PATH that is set.

However, the movement path 100_PATH should be set such that the lawn mower 100 passes through each cell of the lawn area 200 at least once. Only then, can the entire lawn in the lawn area 200 be processed into a desired pattern. Thus, while the user can arbitrarily set the movement path 100_PATH, the user should set the movement path 100_PATH such that the lawn mower 100 passes through each cell of the lawn area 200 at least once, although not fully illustrated in FIG. 6B.

Figure 6C:
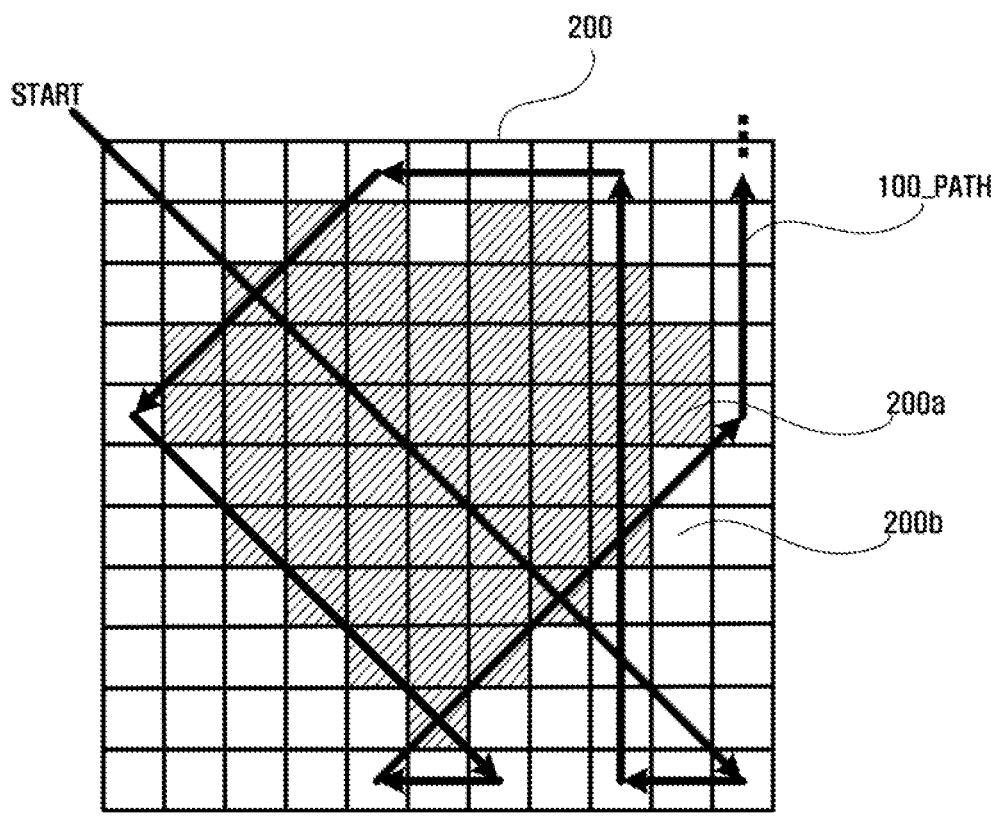

Furthermore, referring to FIG. 6C, the lawn mower 100 according to the current exemplary embodiment is not constrained to move along only a horizontal or vertical movement path 100_PATH in the lawn area 200. As shown in the drawing, the lawn mower 100 can move along a diagonal path 100_PATH as intended by the user. While moving along the diagonal path 100_PATH, the lawn mower 100 may happen to pass through a cell multiple times. Even so, since a lawn processing pattern for the cell remains unchanged, there is no possibility that lawn grass in the cell is processed again, for example, the lawn grass is cut additionally to become shorter. In FIG. 6C, while the user can arbitrarily set the movement path 100_PATH of the lawn mower 100, the user should also set the movement path 100_PATH such that the lawn mower 100 passes through each cell of the lawn area 200 at least once to accurately form a desired image in the lawn area 200.

Partitioning the entire lawn area 200 into two sections, i.e., the first section 200a and the second section 200b as described above is merely an example. The lawn area 200 can also be partitioned into three or more sections by dividing the lawn processing height into three or more levels.

As described above, it is not necessary for a user to move the lawn mower 100 along a certain pattern. Instead, the user can form a desired image on the lawn of the lawn area 200 by freely moving the lawn mower 100 in the lawn area 200 after inputting the desired image into the lawn mower 100. Therefore, anyone can easily form a desired image in the lawn area 200 regardless of how skilled he or she is. Even when the user moves the lawn mower 100 off the movement path 100_PATH by mistake, there is no risk of damaging the image. Furthermore, since no driving elements are required to drive the lawn mower 100 that operates automatically, production costs can be significantly reduced.

Figure 7:
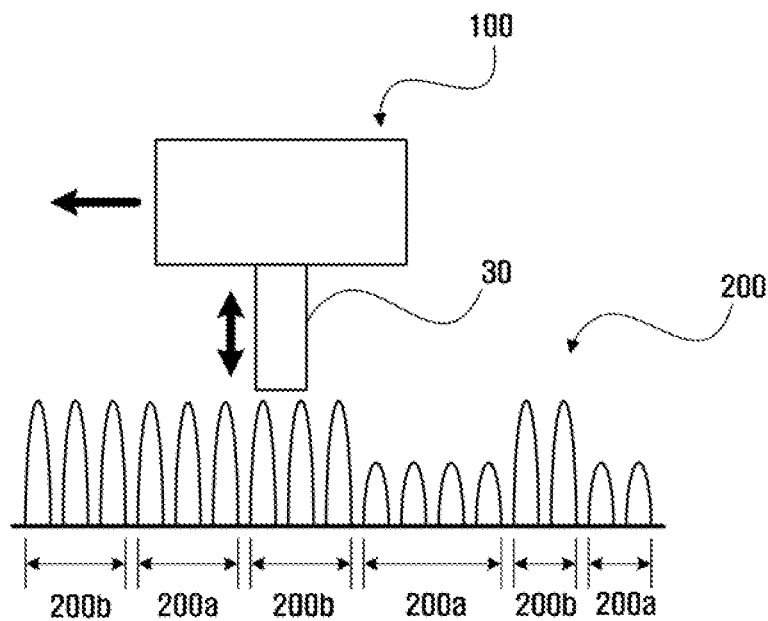
FIGS. 7 and 8 are diagrams for explaining a lawn processing operation of the lawn mower of FIG. 1.
Figure 8:
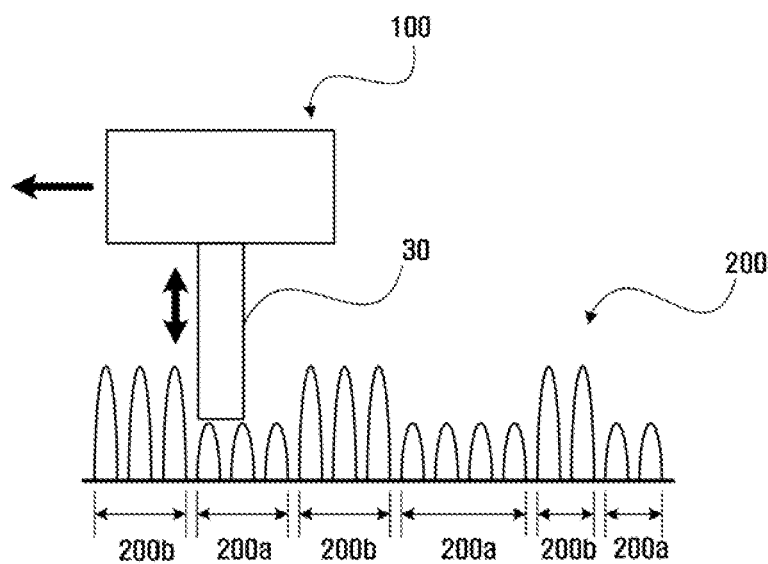

Cross-sectional illustrations of the process of forming an image in the lawn area 200 using the lawn mower 100 are provided in FIGS. 7 and 8.

That is, referring to FIG. 7, when a unit cell corresponding to the first section 200a and a unit cell corresponding to the second section 200b are repeated in the lawn area 200, the lawn mower 100 processes the lawn grass in the lawn area 200 by continuously adjusting the height of the lawn mowing unit 30 as it moves along the movement path 100_PATH.

In FIG. 7, the lawn mower 100 of the lawn mowing unit 30 is positioned above a unit cell of the second section 200b. Here, the lawn mowing unit 30 is maintained at a predetermined height from the ground.

On the other hand, in FIG. 8, the lawn mower 100 of the lawn mowing unit 30 is positioned above a unit cell of the first section 200a. Here, the processing unit 30 is maintained at a lower height from the ground than the above predetermined height. Consequently, the grass planted in the first section 200a is shorter than the grass planted in the second section 200b.

The lawn mower 100 according to the current exemplary embodiment can automatically form a desired image in the lawn area 200 without requiring a user to manually draw an image on a lawn and cut the lawn asymmetrically along the image. In addition, there is no need to repeatedly move the lawn mower 100 along an image. Instead, the lawn mower 100 can rapidly form a desired image on the lawn by processing the lawn while moving along a movement path 100_PATH that the user determines.

Figure 9:
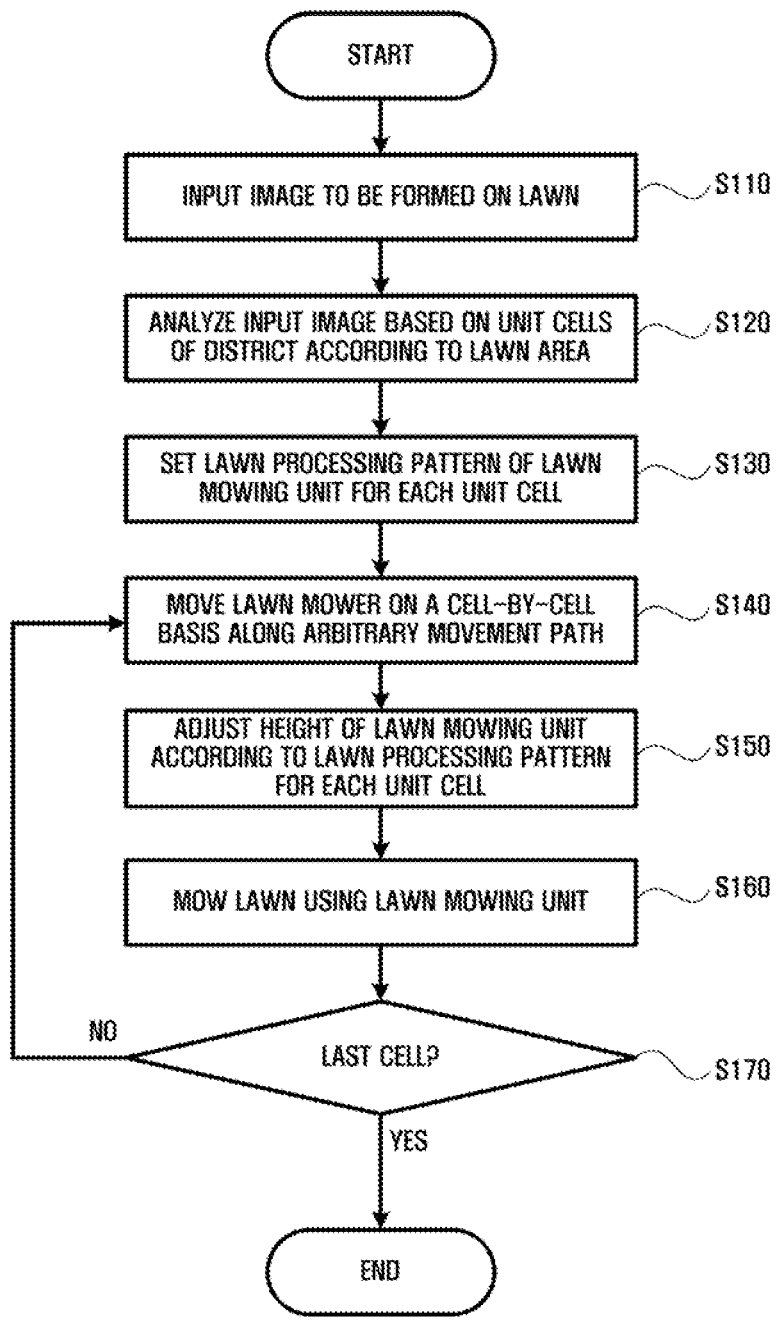
FIG. 9 is a flowchart illustrating a method of forming an image using the lawn mower of FIG. 1 according to an exemplary embodiment of the present invention.

A method of forming an image using the lawn mower 100 according to an exemplary embodiment of the present invention will now be described with reference to FIG. 9. FIG. 9 is a flowchart illustrating a method of forming an image using the lawn mower 100 of FIG. 1 according to an exemplary embodiment of the present invention.

The method of forming an image according to the current exemplary embodiment includes inputting an image to be formed in a lawn area (operation S110), analyzing the input image based on the lawn area (operation S120), determining a lawn processing pattern for each unit cell of the lawn area (operation S130), moving the lawn mower 100 along a movement path of the lawn mower 100 in the lawn area (operation S140), and processing a lawn according to the lawn processing pattern determined for each unit cell of the lawn area (operations S150, S160 and S170).

Specifically, an image to be formed in a lawn area is input (operation S110). As described above, this operation is performed by the image input unit 10 of the lawn mower 100, and various methods can be used to input an image.

Next, the input image is analyzed based on the lawn area (operation S120). In FIG. 9, sections denote predetermined units into which the entire lawn area is partitioned. As described above, the lawn area may include a first section and a second section and may further include third or more sections.

The analyzing of the input image (operation S120) may include perceiving the input image by dividing the input image into parts of a predetermined size and mapping the divided image to the lawn area.

That is, the control unit 40 analyzes the input image and maps the analyzed image to the actual lawn area. Here, the control unit 40 may divide the image into parts corresponding respectively to cells (in the first section and the second section) of the lawn area. The parts of the image are mapped respectively to the cells of the lawn area.

Next, a lawn processing pattern is determined for each cell on a movement path of the lawn mower 100 (operation S130). When a first region (indicated by reference numeral 11a in FIG. 2) that forms an outline of the image overlaps a cell of the lawn area, the cell is determined to be in the first section. On the contrary, when a second region (indicated by reference numeral 11b FIG. 2) that corresponds to the background of the image is mapped onto the cell of the lawn area, the cell is determined to be in the second section.

The control unit 40 may determine different lawn processing patterns (heights and/or directions) for the first section and the second section. The lawn processing patterns may also be determined in advance before the current step.

The lawn mower 100 is moved along an arbitrary movement path (operation S140). The process of moving the lawn mower 100 along the movement path is as described above with reference to FIG. 6.

The control unit 40 adjusts the height or direction of the lawn mowing unit 30 according to the lawn processing pattern determined for a corresponding cell (operation S150) and processes lawn grass planted in the cell using the lawn mowing unit 30 (operation S160). Then, it is determined whether the cell is a last cell of the lawn area (operation S170). If the cell is the last cell, the entire operation is terminated. If the cell is not the last cell, the lawn mower 100 is moved to a next cell along the movement path (operation S140). Then, the above process is repeated.

In the above method of forming an image using the lawn mower 100, a desired image can be automatically formed in a lawn area. Therefore, the method negates the need for a user to manually draw an image on a lawn and cut the lawn asymmetrically along the image. In addition, there is no need to repeatedly move the lawn mower 100 along an image. Instead, the user can rapidly form a desired image on the lawn by processing the lawn while moving the lawn mower 100 along an arbitrary movement path that the user determines.

Also, it is not necessary for the user to move the lawn mower 100 along a certain pattern. Instead, the user can form a desired image in the lawn area by freely moving the lawn mower 100 in the lawn area after inputting the desired image into the lawn mower 100.

Therefore, anyone can easily form a desired image in the lawn area regardless of how skilled he or she is. Even when the user moves the lawn mower 100 off the movement path by mistake, there is no risk of damaging the image. Furthermore, since no driving elements are required to drive the lawn mower 100 that operates automatically, production costs can be significantly reduced.

A lawn mower according to exemplary embodiments of the present invention can automatically form a desired image on a lawn while moving along an arbitrary path in a lawn area regardless of the shape of the image. Therefore, the lawn mower negates the need for a user to manually draw an image on the lawn and cut the lawn asymmetrically along the image.

The lawn mower according to the exemplary embodiments of the present invention can significantly reduce the time required to form an image on a lawn and enables a user to work at any time, even after sunset.

The lawn mower according to the exemplary embodiments of the present invention does not need to regularly and repeatedly move along an outline of an image or pixels of the image. Therefore, the lawn mower can automatically and rapidly form a desired image on a lawn by processing the lawn as usual, regardless of the shape of the image.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A lawn mower for forming images, the lawn mower comprising:
   an image input unit configured to receive an image to be formed in a lawn area;
   a position detection unit configured to detect position information of the lawn mower on an arbitrary movement path of the lawn mower;
   a lawn mowing unit configured to process a lawn according to any one of a plurality of lawn processing patterns which corresponds to each position on the arbitrary movement path while the lawn mower moves along the arbitrary movement path, wherein the lawn mowing unit comprises a processor with at least one of a direction and height that is adjustable independently of the arbitrary movement path of the lawn mower; and
   a control unit configured to analyze the image received from the image input unit, further configured to determine a lawn processing pattern, which corresponds to the position information detected by the position detection unit, to express the image in the lawn area, and further configured to control the lawn mowing unit according to the determined lawn processing pattern and being independent of the arbitrary movement path of the lawn mower.

2. The lawn mower of claim 1, wherein the arbitrary movement path is determined by at least one of a user and the control unit.

3. The lawn mower of claim 1, wherein the lawn processing patterns comprise a first pattern processed along a predetermined direction and a second pattern processed in a direction different from the predetermined direction.

4. The lawn mower of claim 3, wherein the lawn processing patterns comprise three or more patterns having different directions.

5. The lawn mower of claim 1, wherein the lawn processing patterns comprise a first pattern having a predetermined height and a second pattern having a height different from the predetermined height.

6. The lawn mower of claim 5, wherein the lawn processing patterns comprise three or more patterns having different heights.

* * * * *